United States Patent
Lee et al.

(10) Patent No.: US 10,080,232 B2
(45) Date of Patent: Sep. 18, 2018

(54) METHOD FOR TRANSMITTING DEVICE-TO-DEVICE (D2D) SIGNAL IN WIRELESS COMMUNICATION SYSTEM AND DEVICE FOR SAME

(71) Applicant: LG ELECTRONICS INC., Seoul (KR)

(72) Inventors: Seungmin Lee, Seoul (KR); Hanbyul Seo, Seoul (KR); Jihyun Lee, Seoul (KR); Hakseong Kim, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 30 days.

(21) Appl. No.: 15/305,638

(22) PCT Filed: May 18, 2015

(86) PCT No.: PCT/KR2015/004961
§ 371 (c)(1),
(2) Date: Oct. 20, 2016

(87) PCT Pub. No.: WO2015/178642
PCT Pub. Date: Nov. 26, 2015

(65) Prior Publication Data
US 2017/0055275 A1    Feb. 23, 2017

Related U.S. Application Data

(60) Provisional application No. 61/994,984, filed on May 18, 2014.

(51) Int. Cl.
*H04W 72/12* (2009.01)
*H04W 76/14* (2018.01)
(Continued)

(52) U.S. Cl.
CPC .............. *H04W 72/12* (2013.01); *H04B 7/26* (2013.01); *H04W 56/00* (2013.01);
(Continued)

(58) Field of Classification Search
CPC . H04W 72/12; H04W 72/0446; H04W 92/18; H04W 56/00; H04W 72/04
(Continued)

(56) References Cited

U.S. PATENT DOCUMENTS

2013/0142268 A1* 6/2013 Gao .................... H04W 76/14
375/252
2013/0322413 A1   12/2013 Pelletier et al.
(Continued)

FOREIGN PATENT DOCUMENTS

EP    3125633    2/2017

OTHER PUBLICATIONS

3GPP, CATT (Resource allocation for D2D synchronization), May 19-23, 2014, 5 pages.*
(Continued)

*Primary Examiner* — Jae Y Lee
*Assistant Examiner* — Jean F Voltaire
(74) *Attorney, Agent, or Firm* — Lee, Hong, Degerman, Kang & Waimey (57) ABSTRACT

The present invention relates to a method and a device for transmitting, by a first terminal, a device-to-device (D2D) signal in a wireless communication system. Particularly, the method comprises the steps of: performing D2D transmission scheduling for a device-to-device synchronization signal (D2DSS) and a device-to-device channel (D2DCH); and transmitting a D2D signal on a first D2D subframe among a plurality of D2D subframes, wherein the first D2D subframe is a D2D subframe in which a D2D synchronization signal transmission for the first terminal is configured among D2D
(Continued)

subframes configured to enable a D2D synchronization signal transmission, and the D2D signal drops the D2DCH when the D2DSS and the D2DCH are simultaneously scheduled on the first D2D subframe.

2 Claims, 10 Drawing Sheets (51) Int. Cl.
| | | |
|---|---|---|
| *H04B 7/26* | (2006.01) | |
| *H04W 56/00* | (2009.01) | |
| *H04W 72/04* | (2009.01) | |
| *H04W 8/00* | (2009.01) | |
| *H04W 48/16* | (2009.01) | |
| *H04W 92/18* | (2009.01) | |

(52) U.S. Cl.
CPC ....... *H04W 72/0446* (2013.01); *H04W 76/14* (2018.02); *H04W 8/005* (2013.01); *H04W 48/16* (2013.01); *H04W 92/18* (2013.01)

(58) Field of Classification Search
USPC .......................................................... 370/329
See application file for complete search history.

(56) References Cited

U.S. PATENT DOCUMENTS

| 2014/0254429 | A1* | 9/2014 | Wang | .................... | H04L 5/0037 |
| | | | | | 370/254 |
| 2015/0245334 | A1* | 8/2015 | Chang | .................... | H04W 76/14 |
| | | | | | 370/329 |
| 2015/0264552 | A1* | 9/2015 | Xiong | .................... | H04W 8/005 |
| | | | | | 370/329 |

OTHER PUBLICATIONS

3GPP, LG Electronics (Discussion on resource allocation for D2D synchronization), May 19-23, 2014, 5 pages.*
PCT International Application No. PCT/KR2015/004961, Written Opinion of the International Searching Authority dated Sep. 10, 2015, 18 pages.
LG Electronics, "Discussion on resource allocation for D2D synchronization", R1-142157, 3GPP TSG RAN WG1 Meeting #77, May 10, 2014, 5 pages.
CATT, "Resource allocation for D2D synchronization", R1-142006, 3GPP TSG RAN WG1 Meeting #77, May 10, 2014, 5 pages.
Interdigital, "Synchronization signal and channel design for D2D", R1-142352, 3GPP TSG RAN WG1 Meeting #77, May 10, 2014, 3 pages.
Samsung, "TDM resource allocation for D2D synchronization", R1-142118, 3GPP TSG RAN WG1 Meeting #77, May 10, 2014, 5 pages.
European Patent Office Application Serial No. 15796732.4, Search Report dated Dec. 7, 2017, 18 pages.
Ericsson, "Frame Structure for D2D-Enabled LTE Carriers", 3GPP TSG RAN WG1 Meeting #77, R1-142408, May 2014, 4 pages.
CATT, "On D2D resource collision", 3GPP TSG RAN WG1 Meeting #79, R1-144613, Nov. 2014, 4 pages.
Huawei et al., "Transmssion and reception in the D2DSS/PD2DSCH overlapped resource", 3GPP TSG RAN WG1 Meeting #79, R1-144570, Nov. 2014, 6 pages.
Nokia, "Synchronization procedure for D2D communication and discovery", 3GPP TSG RAN WG1 Meeting #77, R1-142453, May 2014, 8 pages.
Kyocera, "Synchronization resource allocation", 3GPP TSG RAN WG1 Meeting #77, R1-142487, May 2014, 4 pages.
Ericsson, "Synchronization Signals and Channel Design for D2D", 3GPP TSG RAN WG1 Meeting #77, R1-142409, May 2014, 8 pages.
LG Electronics, "Discussion on D2D Synchronization Procedure", 3GPP TSG RAN WG1 Meeting #76, R1-140330, Feb. 2014, 8 pages.
LG Electronics, "Multiplexing of Uu and D2D communication", 3GPP TSG RAN WG1 Meeting #76, R1-140335, Feb. 2014, 8 pages.
LG Electronics, "Issues on multiplexing of WAN and D2D", 3GPP TSG RAN WG1 Meeting #76bis, R1-141354, Apr. 2014, 10 pages.
LG Electronics, "Multiplexing issues of WAN and D2D", 3GPP TSG RAN WG1 Meeting #77, R1-142152, May 2014, 3 pages.
Ericsson, "D2D Physical Channels Design", 3GPP TSG RAN WG1 Meeting #77, R1-142398, May 2014, 10 pages.

* cited by examiner

(a) control plane protocol stack (b) user plane protocol stack

METHOD FOR TRANSMITTING DEVICE-TO-DEVICE (D2D) SIGNAL IN WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2015/004961, filed on May 18, 2015, which claims the benefit of U.S. Provisional Application No. 61/994,984, filed on May 18, 2014, the contents of which are all hereby incorporated by reference herein in their entirety.

TECHNICAL FIELD

The present invention relates to a wireless communication system, and more particularly, to a method for transmitting a D2D (device-to-device) signal in a wireless communication system and device for the same.

BACKGROUND ART

A 3rd generation partnership project long term evolution (3GPP LTE) (hereinafter, referred to as 'LTE') communication system which is an example of a wireless communication system to which the present invention can be applied will be described in brief.

Figure 1:
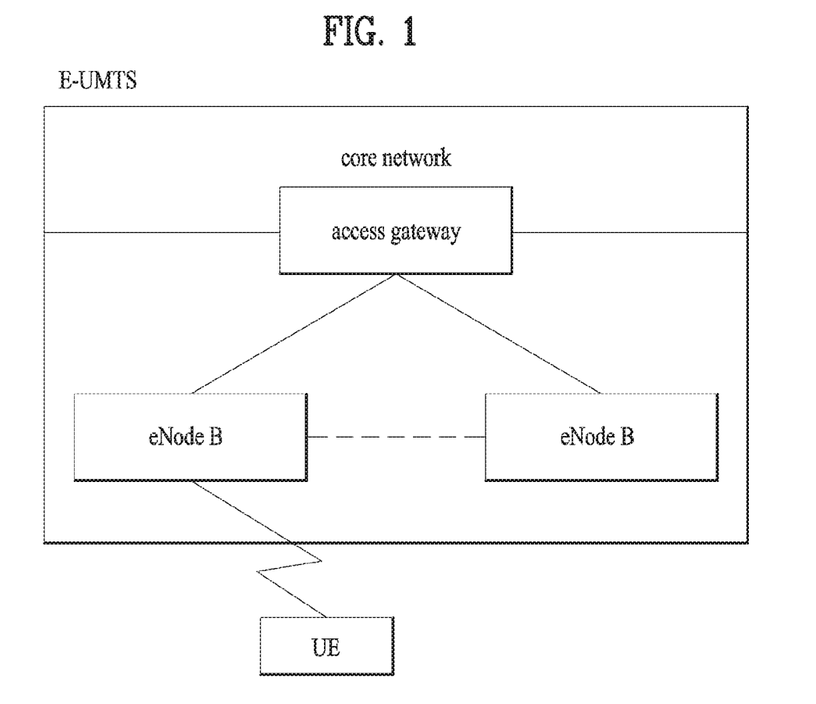
FIG. 1 is a schematic diagram of an E-UMTS network structure as one example of a wireless communication system.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

In order to assist an eNB and efficiently managing a wireless communication system, a UE periodically and/or aperiodically reports state information about a current channel to the eNB. The reported channel state information may include results calculated in consideration of various situations, and accordingly a more efficient reporting method is needed.

DISCLOSURE OF THE INVENTION

Technical Task

Based on the above-described discussion, a method for transmitting a D2D (device-to-device) signal in a wireless communication and device for the same will be proposed.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of transmitting a D2D (device-to-device) signal of a first user equipment in a wireless communication system, including: performing D2D transmission scheduling for a D2DSS (device-to-device synchronization signal) and a D2DCH (device-to-device channel); and transmitting the D2D signal in a first D2D subframe among a plurality of D2D subframes, wherein the first D2D is a D2D subframe configured for transmission of a D2DSS of the first user equipment among D2D subframes configured to be available for D2DSS transmission, and wherein when the D2DSS and the D2DCH are simultaneously scheduled in the first D2D subframe, the D2DCH is dropped from the D2D signal.

Additionally, the method may include transmitting the D2D signal in a second D2D subframe among the plurality of the D2D subframes and the second D2D subframe may be a D2D subframe configured for transmission of a D2DSS of a second user equipment among the D2D subframes configured to be available for the D2DSS transmission.

Additionally, when the D2DSS and the D2DCH are simultaneously scheduled in the second D2D subframe, the D2DCH may be dropped from the D2D signal.

Additionally, when in the second D2D subframe, a resource region for the D2DSS transmission overlaps at least partially with a resource region for D2DCH transmission and the D2DSS and the D2DCH are simultaneously scheduled, the D2D channel may be dropped from the D2D signal.

Further, the resource region for the D2DSS transmission may include a D2DSS transmission frequency region and a guard region for the D2DSS transmission. Preferably, the D2D channel may contain scheduling assignment and data and when the resource region for the D2DCH transmission does not overlap with the D2DSS transmission frequency region but overlaps with the guard region, the data may be dropped only.

In another technical aspect of the present invention, provided herein is a method of receiving a D2D (device-to-device) signal of a first user equipment in a wireless communication system, including: performing D2D transmission scheduling for a D2DSS (device-to-device synchronization signal) and a D2DCH (device-to-device channel); and receiving D2D signals in a first D2D subframe and a second D2D subframe among a plurality of D2D subframes, wherein the first D2D subframe is a D2D subframe configured for transmission of a D2DSS of a second user equipment that belongs to an interference group with the first user equipment among D2D subframes configured to be available for D2DSS transmission, wherein the second D2D subframe is a D2D subframe configured for transmission of a D2DSS of a third user equipment that belongs to a non-interference group with the first user equipment among the D2D subframes configured to be available for the D2DSS transmission, and wherein when the D2DSS and the D2DCH are simultaneously scheduled, the D2DCH is dropped in the first D2D subframe from the D2D signal.

Additionally, the third user equipment may be located out of network coverage of the first user equipment.

Additionally, the second D2D subframe may be used in D2DCH transmission or D2DSS reception according to a predetermined probability in order to monitor the D2DSS.

In another further technical aspect of the present invention, provided herein is a first user equipment for transmitting a D2D (device-to-device) signal in a wireless communication system, including: a radio frequency unit; and a processor, wherein the processor is configured to perform D2D transmission scheduling for a D2DSS (device-to-device synchronization signal) and a D2DCH (device-to-device channel) and transmit a D2D signal in a first D2D subframe among a plurality of D2D subframes, wherein the first D2D subframe is a D2D subframe configured for transmission of a D2DSS of the first user equipment among D2D subframes configured to be available for D2DSS transmission, and wherein when the D2DSS and the D2DCH are simultaneously scheduled in the first D2D subframe, the D2DCH is dropped from the D2D signal.

Advantageous Effects

According to embodiments of the present invention, transmission of a D2D (device-to-device) signal can be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

Figure 2:
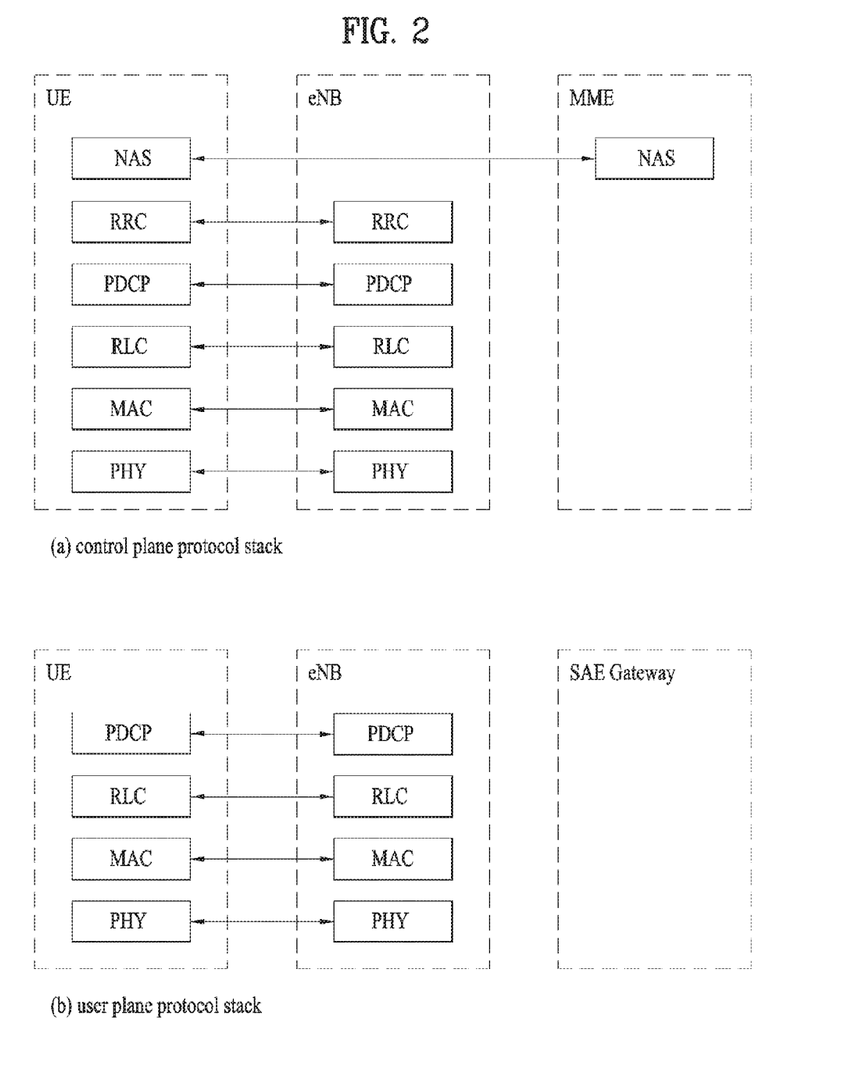
FIG. 2 illustrates structures of control and user planes of a radio interface protocol between a user equipment and E-UTRAN based on 3GPP radio access network standard.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
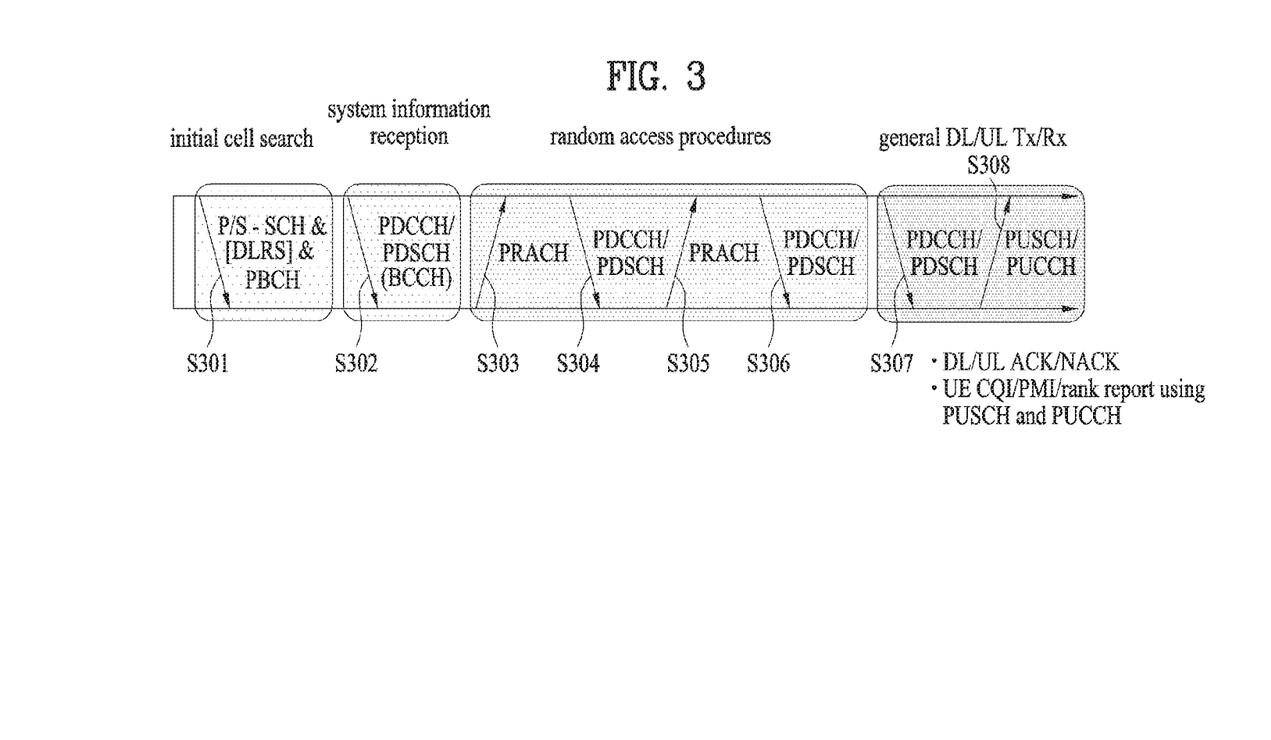
FIG. 3 illustrates physical channels used in a 3GPP LTE system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
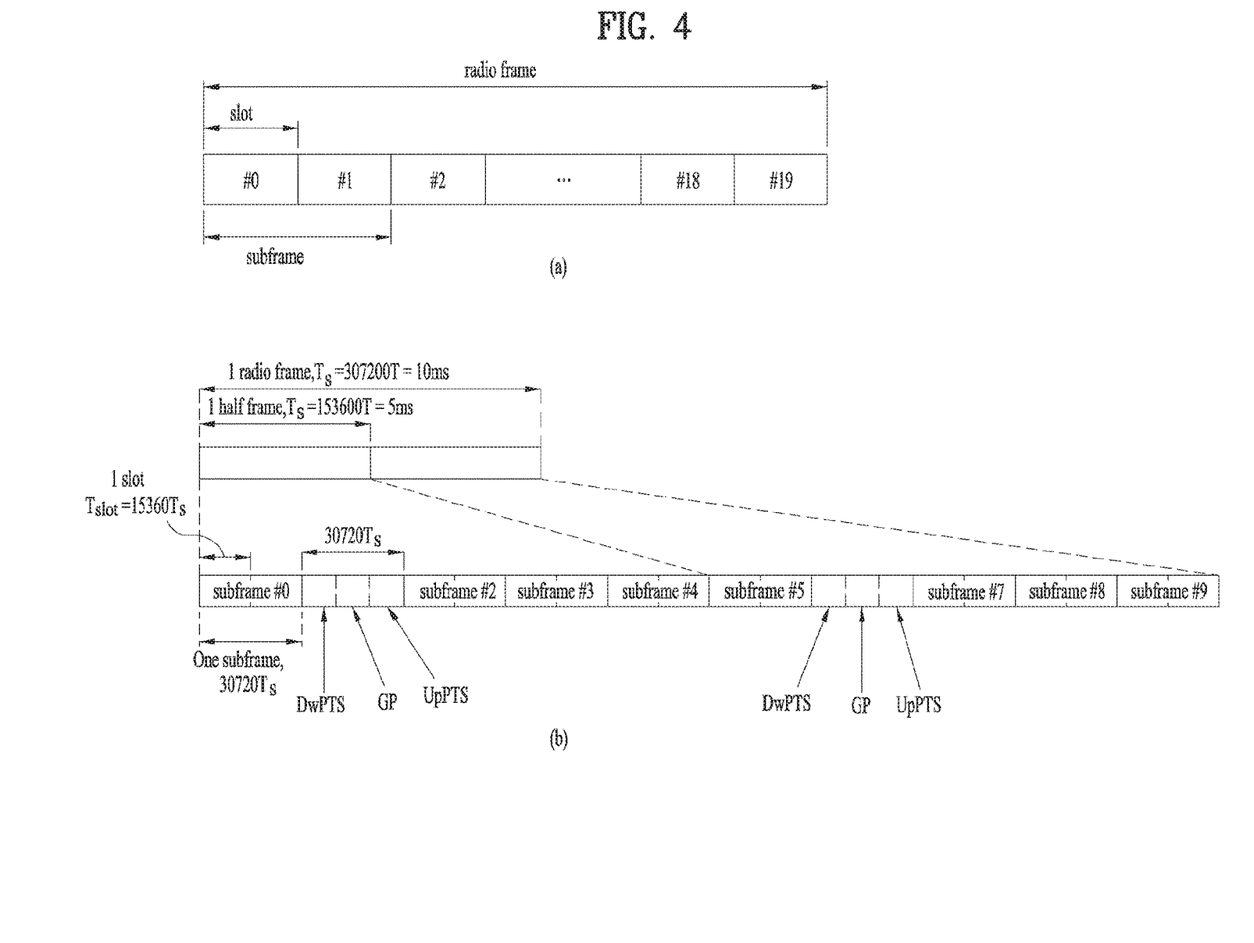
FIG. 4 illustrates a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| | | Normal cyclic prefix in downlink | | Extended cyclic prefix in downlink | | |
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
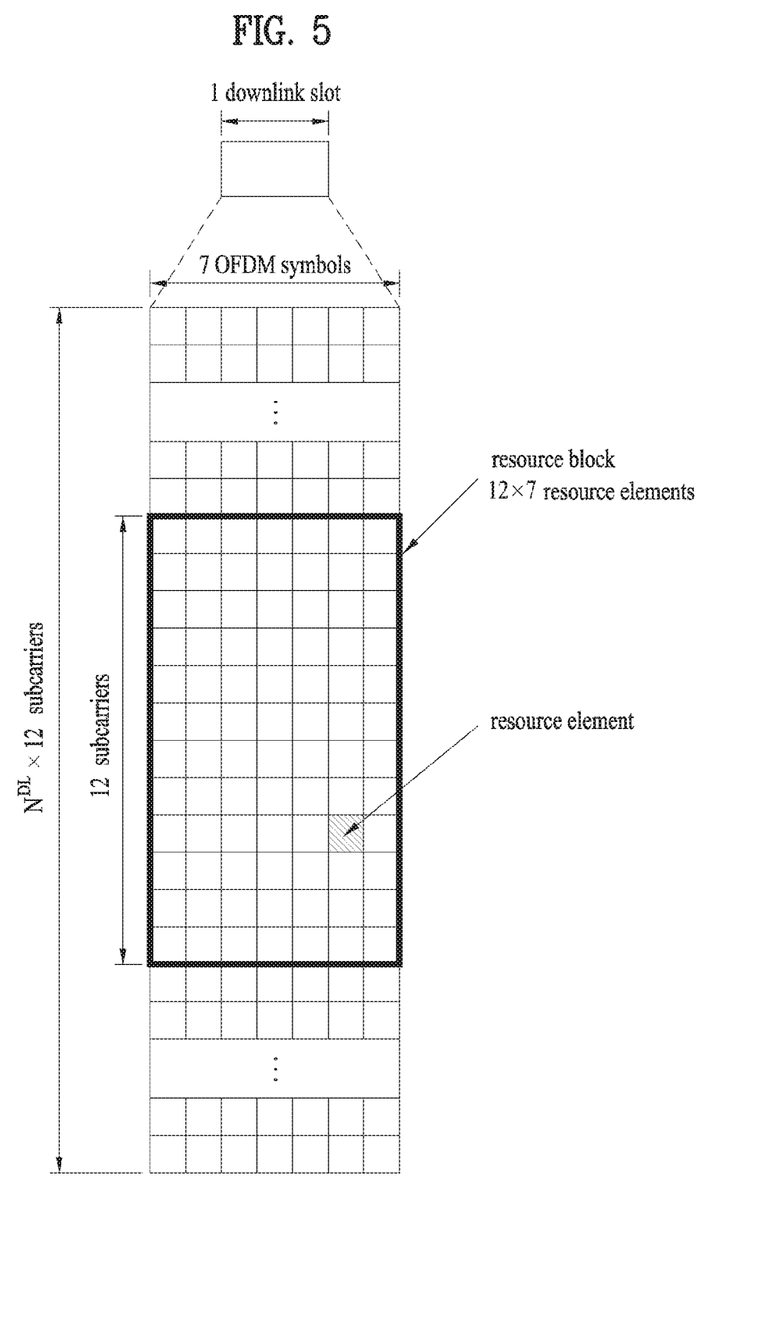
FIG. 5 illustrates a resource grid for a downlink slot.

FIG. 5 is a diagram of a resource grid for a downlink slot. Referring to FIG. 5, a DL slot includes $N_{symb}^{DL}$ OFDM symbols in time domain and $N_{RB}^{DL}$ resource blocks. Since each of the resource blocks includes $N_{sc}^{RB}$ subcarriers, the DL slot includes $N_{RB}^{DL} \times N_{sc}^{RB}$ subcarriers in frequency domain. FIG. 5 shows one example that the DL slot includes 7 OFDM symbols and that the resource block includes 12 subcarriers, by which the present invention is non-limited. For instance, the number of OFDM symbols included in the DL slot can be modified according to a length of a cyclic prefix (CP).

Each element on a resource grid is called Resource Element (RE) and 1 single resource element is indicated by a single OFDM symbol index and a single subcarrier index. A single RB is configured with $N_{symb}^{DL} \times N_{sc}^{RB}$ resource elements. The number $N_{RB}^{DL}$ of resource blocks included in the DL slot is dependent on a DL transmission bandwidth configured in a cell.

Figure 6:
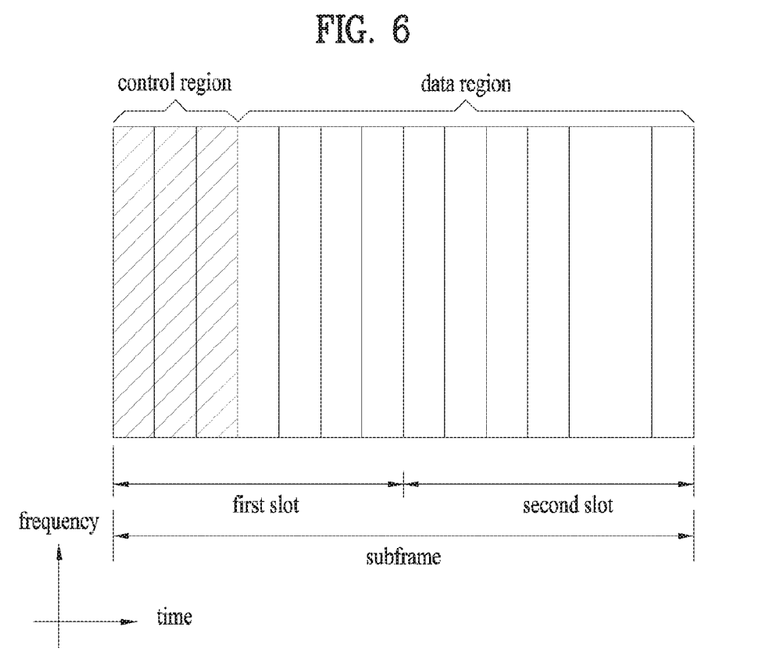
FIG. 6 illustrates a structure of a downlink radio frame used in an LTE system.

FIG. 6 is a diagram for one example of a structure of a downlink subframe.

Referring to FIG. 6, maximum 3 (or 4) OFDM symbols situated at a head part of a $1^{st}$ slot of a subframe correspond to a control region to which a control channel is assigned. And, the rest of OFDM symbols correspond to a data region to which PDSCH (physical downlink shared channel) is assigned. For example, DL control channels used by 3GPP LTE may include PCFICH (Physical Control Format Indicator Channel), PDCCH (Physical Downlink Control Channel), PHICH (Physical hybrid ARQ indicator Channel) and the like. The PCFICH is transmitted on a $1^{st}$ OFDM symbol of a subframe and carries information on the number of OFDM symbols used for a control channel transmission in the subframe. The PHICH carries HARQ ACK/NACK (acknowledgment/negative-acknowledgment) signal in response to a UL transmission.

Control information transmitted on PDCCH is called DCI (downlink control information). The DCI includes resource allocation information and other control informations for a user equipment or a user equipment group. For instance, the DCI may include UL/DL scheduling information, UL transmission (Tx) power control command and the like.

PDCCH carries transmission format and resource allocation information of DL-SCH (downlink shared channel), transmission format and resource allocation information of UL-SCH (uplink shared channel), paging information on PCH (paging channel), system information on DL-SCH, resource allocation information of an upper-layer control message such as a random access response transmitted on PDSCH, Tx power control command set for individual user equipments within a user equipment group, Tx power control command, activation indication information of VoIP (voice over IP) and the like. A plurality of PDCCHs may be transmitted in a control region. A user equipment can monitor a plurality of PDCCHs. PDCCH is transmitted on aggregation of at least one or more contiguous CCEs (control channel elements). In this case, the CCE is a logical assignment unit used to provide PDCCH with a coding rate based on a radio channel state. The CCE corresponds to a plurality of REGs (resource element groups). PDCCH format and the number of PDCCH bits are determined depending on the number of CCEs. A base station determines PDCCH format in accordance with DCI to transmit to a user equipment and attaches CRC (cyclic redundancy check) to control information. The CRC is masked with an identifier (e.g., RNTI (radio network temporary identifier)) in accordance with an owner or a purpose of use. For instance, if PDCCH is provided for a specific user equipment, CRC may be masked with an identifier (e.g., C-RNTI (cell-RNTI)) of the corresponding user equipment. If PDCCH is provided for a paging message, CRC may be masked with a paging identifier (e.g., P-RNTI (paging-RNTI)). If PDCCH is provided for system information (particularly, SIC (system information block)), CRC may be masked with SI-RNTI (system information-RNTI). And, if PDCCH is provided for a random access response, CRC may be masked with RA-RNTI (random access-RNTI).

Figure 7:
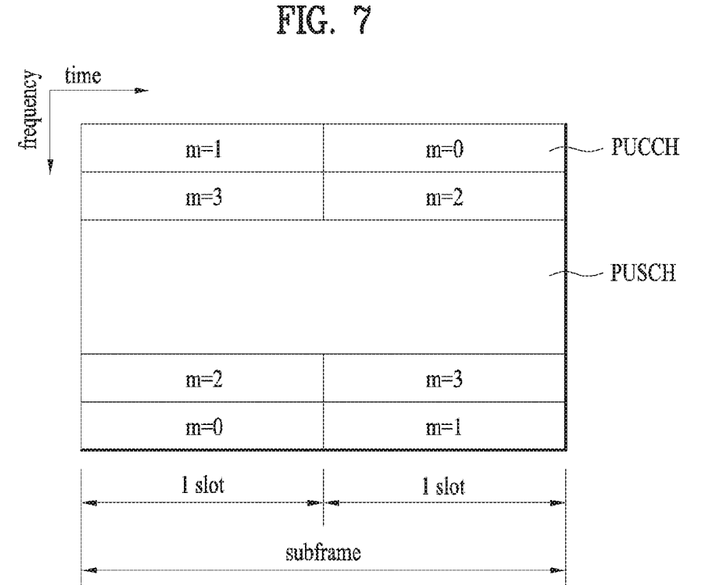
FIG. 7 illustrates a structure of an uplink subframe used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, D2D (UE-to-UE) communication will be described.

D2D communication schemes can be mainly divided into a scheme supported by a network/coordination station (e.g., base station) and a scheme not supported by the network/coordination station.

Figure 8:
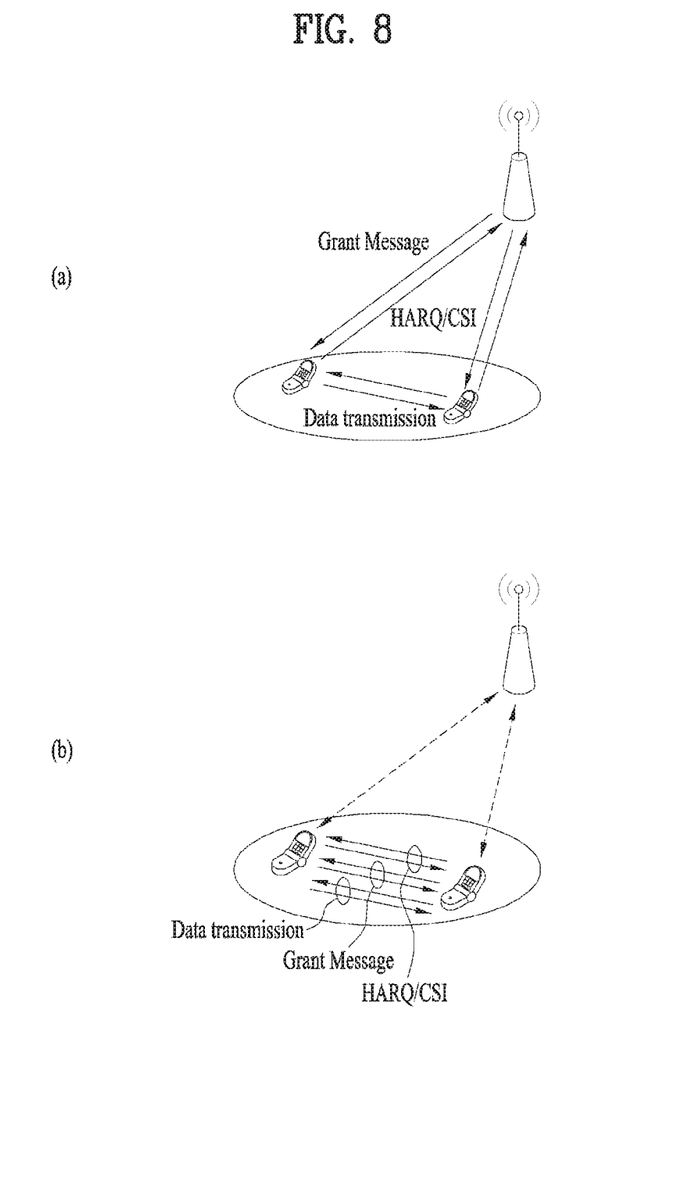
FIG. 8 is a reference diagram for explaining D2D communication.
Figure 9:
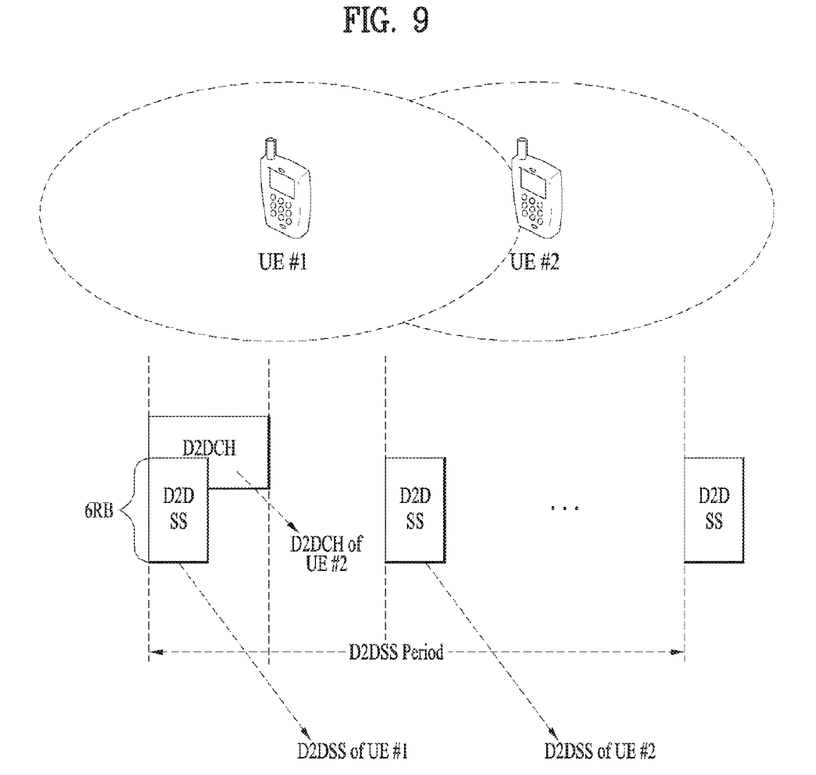
FIG. 9 is a reference diagram for explaining a case in which when D2DSS transmission is performed, transmission resources overlap between a plurality of UEs.

Referring to FIG. 8, FIG. 8 (a) illustrates a scheme in which the network/coordination station intervenes in transmission and reception of control signals (e.g., grant message), HARQ, channel state information, etc. and user equipments that perform D2D communication transmit and receive data only. On the other hand, FIG. 9 (b) illustrates a scheme in which the network provides minimum information (e.g., D2D connection information available in a corresponding cell) only but the user equipments that perform D2D communication establish links and also transceive data.

The present invention is directed to a method of multiplexing D2DSS (device-to-device synchronization signal) transmission and D2DCH (device-to-device channel) transmission for D2D communication in the frequency domain, and more particularly, to operations of a UE when the transmission of the D2DSS and D2DCH is scheduled at the same time (i.e., SF).

In the present invention, the D2DSS (D2D synchronization signal) means a synchronization signal for D2D discovery or D2D communication. The D2DCH (D2D channel) means a channel on which data or control information for the D2D discovery or D2D communication is transmitted.

A UE may transmit a D2DSS according to a specific period (e.g., 40 ms). In this case, a subframe in which the D2DSS is transmitted may be limited to a specific frequency region such as 6 RBs (resource blocks) at the middle of a system bandwidth. Thus, RBs corresponding to the remaining frequency region may be configured to be used in D2DCH transmission and reception. In this case, resources for the D2DSS transmission i) may be periodically allocated by an eNB, ii) may be allocated using a timing obtained from a specific UE so as to have a predetermined pattern, or iii) may be allocated (using the timing obtained from the specific UE) so as to have a pattern configured by the specific UE. In addition, resources for the D2DCH transmission i) may be allocated by the eNB either periodically or aperiodically, ii) may be allocated periodically according to a predetermined pattern, or iii) may be scheduled by SA (scheduling assignment) either periodically or aperiodically.

First of all, when transmission of a D2DCH of a UE is scheduled in a subframe for transmission of a D2DSS of the UE, the UE may drop the D2DCH transmission by giving priority to the D2DSS.

In addition, when the transmission of the D2DCH of the UE is scheduled in a subframe except the subframe for transmission of the D2DSS of the UE among subframes capable of transmitting D2DSSs, the UE may operate according to at least one of first to third methods in the following description.

First Method

If transmission of a D2DCH of a UE is scheduled in a subframe except a subframe for transmission of a D2DSS of the UE among subframes capable of transmitting D2DSSs, the UE may drop the D2DCH transmission. This is to prevent interference to another D2DSS. In addition, the UE may perform reception/detection of the D2DSS on the corresponding subframe.

Second Method

If transmission of a D2DCH of a UE is scheduled in a subframe except a subframe for transmission of a D2DSS of the UE among subframes capable of transmitting D2DSSs, the UE transmits the D2DCH when RBs for transmitting the D2DCH do not overlap with RBs for transmitting the D2DSS. If some RBs overlap, the UE may drop the D2DCH transmission. This is to prevent interference to another D2DSS similar to the aforementioned first method. Similar to the first method, the UE may perform reception or detection of the D2DSS on the corresponding section.

In addition, a guard band for a D2DSS transmission frequency region may be configured in order to protect the D2DSS transmission from in-band emission. In this case, the UE should determine whether not only the D2DSS transmission frequency region but also a guard RB adjacent to a D2D transmission RB overlaps with a region for transmitting the D2DCH. That is, when the D2DCH transmission region overlaps with all or part of the frequency region designated as the guard, the UE should drop the D2DCH transmission even though the D2DCH transmission region does not overlap with the D2DSS transmission region. In other words, only when there is no region which overlaps with all or part of the guard region and the D2D transmission region, the UE performs the D2DCH transmission.

Alternatively, the UE may be configured to perform different operation depending on whether the D2DCH transmission collided with the D2DSS transmission is SA transmission or data transmission. For instance, the second method is basically applied to both of the SA and data. In the case of the data, when there is a region overlapping with the guard region and the D2DSS transmission region, the data transmission may be dropped. On the other hand, in the case of the SA, when there is a region overlapping with only the D2DSS transmission region, i.e., when there is a region which does not overlaps with the D2DSS transmission region but overlaps with the guard region, the SA transmission may be performed exceptionally.

Alternatively, when the D2DCH transmission collided with the D2DSS transmission is the SA transmission, the second method may be applied. And, when the D2DCH transmission collided with the D2DSS transmission is the data transmission, the first method may be applied.

Moreover, the present invention can be identically applied to a case in which D2DSS transmission resources and WAN UL transmission resources for UEs located within coverage of a network are scheduled by overlapping with each other.

Further, when a D2DSS transmission timing of a specific UE is different from that of another UE, it is possible to perform TDM (time division multiplexing) on transmission of D2DSSs from respective UEs. The present invention can be applied to the following cases:

A case in which a plurality of resources capable of transmitting the D2DSS are present in one period: In this case, a UE may transmit the D2DSS by selecting some subframes (e.g., one subframe) from a plurality of subframes capable of transmitting the D2DSS. In addition, since the D2DSS is not transmitted in non-selected subframes, the first method or the second method may be applied.

A case in which UEs have different transmission periods: For instance, a specific UE may transmit the D2DSS with a period of 40 ms, whereas another UE may transmit the D2DSS with a period of 80 ms. In this case, the UE having the period of 80 ms uses only 50 percent of the subframes capable of transmitting the D2DSS (e.g., only 50 percent of the subframes capable of transmitting the D2DSS during the 80 ms period (or time window) is used). That is, since the D2DSS is not transmitted in the remaining subframes (e.g., another 50 percent which does not transmit the D2DSS), the UE may operate according to the first method or the second method.

FIG. 9 is a reference diagram for explaining a case in which when UE #1 and UE #2 performs D2DSS transmission on different resource regions according to the present invention, resources for transmitting a D2DCH of the UE #2 overlaps with resources for transmitting a D2DSS of the UE #1. When network coverage of a UE overlaps with that of another UE as shown in FIG. 9, the first method or the second method may be applied to i) the subframe that is not selected for the D2DSS transmission or ii) the subframe that is not used for the D2DSS transmission due to the different periods.

Meanwhile, when D2DSS transmission performed by a UE does not cause interference to D2DSS transmission performed by another UE, UE operation may be defined differently from the above-described first or second method.

Figure 10:
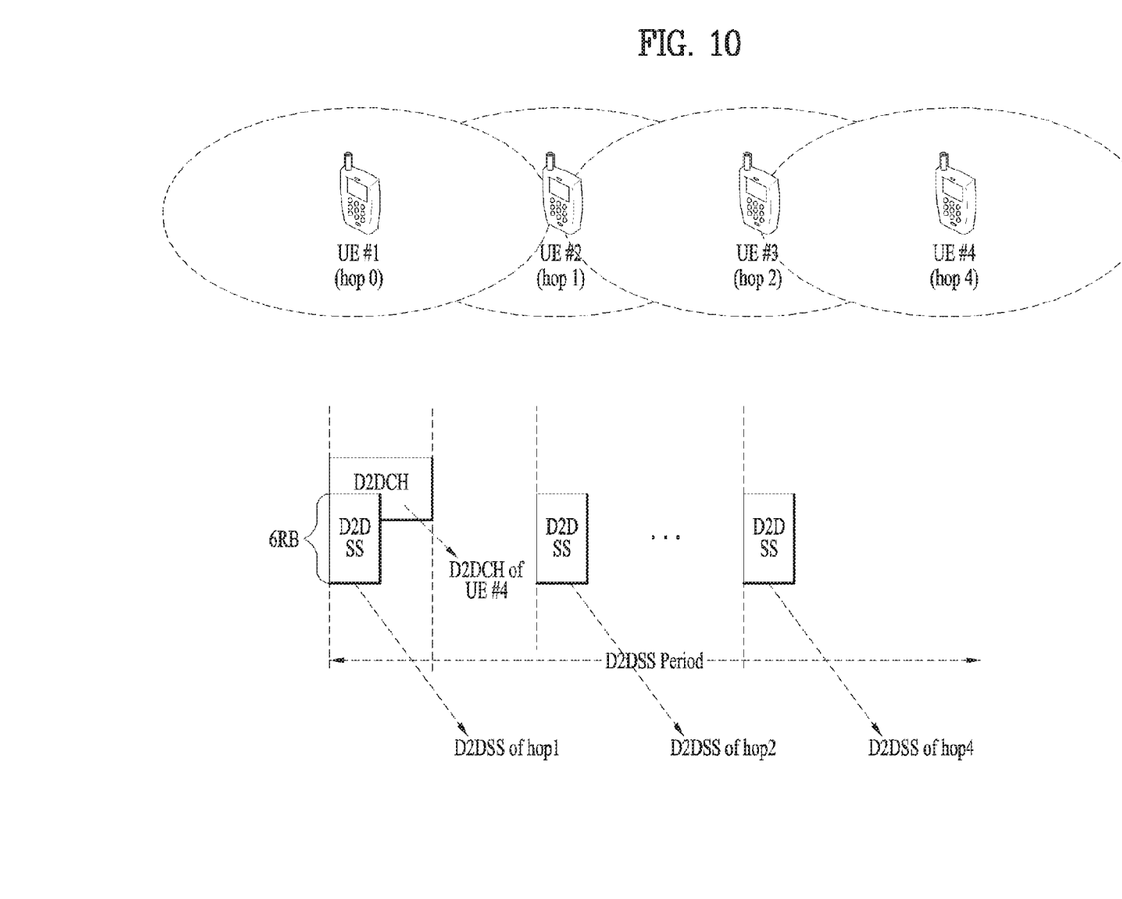
FIG. 10 is a reference diagram for explaining a scenario depending on whether there is interference between a plurality of UEs when D2DSS transmission is performed.

FIG. 10 is a reference diagram for explaining a case in which D2DSS transmission performed by a UE does not cause interference to D2DSS transmission performed by another UE. As shown in FIG. 10, when D2DSS transmission has a hierarchy structure, UEs may be divided into an interference group and a non-interference group. Thus, instead of applying the second method, a specific UE may use a third method with regard to a subframe for transmission of a D2DSS of another UE, which belongs to a non-interference group with the specific UE.

Third Method

According to the third method (for example, if transmission of a D2DCH of a UE is scheduled in a subframe except a subframe for transmission of a D2DSS of the UE among subframes capable of transmitting D2DSSs), the UE may transmit the D2DCH regardless of whether a D2DCH transmission region overlaps with at least part of (i.e., all or part of) a D2DSS transmission region. Alternatively, the UE may randomly determine transmission of the D2DCH and reception of the D2DSS according to a specific probability in order to perform (new) D2DSS monitoring on the corresponding subframe. In this case, for example, the specific probability may be indicated through higher layer signaling or be determined in advance.

For instance, in FIG. 10, a UE with hop 4 and a UE with hop 1 are defined as a non-interference group. Thus, UE #4 may apply the first method or the second method with regard to resources for transmission of a D2DSS of UE #3, which is synchronized with the UE #4, whereas the UE #4 may apply the third method with regard to resources for transmission of a D2DSS of UE #1, which is out of coverage of the UE #4. In addition, according to the third method, the D2DCH transmission may not be performed on a subframe for transmission of a D2DSS of UE #2, which corresponds to a reception subframe of the UE #2, for the purpose of reception of the D2DSS of the UE #2.

In addition, in the case of the third method, when the D2DCH transmission is not scheduled, a UE may be configured to perform an operation of receiving the D2DCH without receiving the D2DSS. This may be identically applied to the second method. That is, even when the transmission of the D2DCH of the UE is not scheduled in the subframe except the subframe for the transmission of the D2DSS of the UE among the subframes capable of transmitting the D2DSSs, the UE may be configured to perform the D2DCH reception operation without receiving the D2DSS.

Moreover, even in a subframe where the UE transmits the D2DSS, the UE may randomly select whether to perform D2D transmission (e.g., D2DSS, D2DCH, etc.) according to a specific probability for the purpose of monitoring. According to the above-mentioned method, it has advantages in that the corresponding UE can perform an operation of detecting (new) D2DSSs transmitted from other UEs even in a resource region in which the UE transmits the D2DSS.

Figure 11:
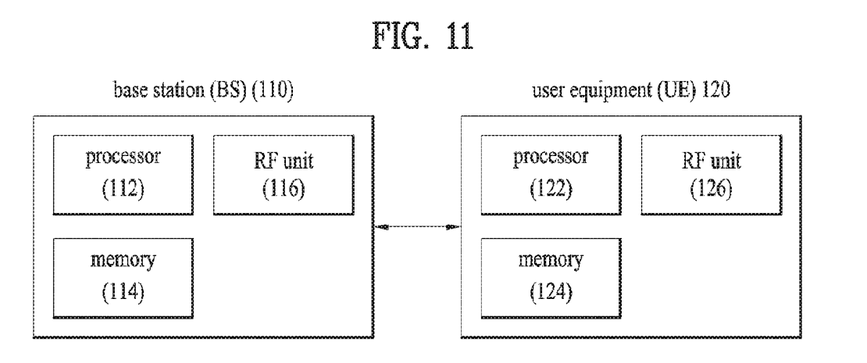
FIG. 11 is a diagram of a base station and a user equipment applicable to one embodiment of the present invention.

FIG. 11 is a diagram of a base station and a user equipment applicable to one embodiment of the present invention.

If a relay node is included in a wireless communication system, communication in a backhaul link is performed between a base station and the relay node and communication in an access link is performed between the relay node and a user equipment. Therefore, the base station or user equipment shown in the drawing can be substituted with the relay node in some cases.

Referring to FIG. 11, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method for transmitting a D2D (device-to-device) signal in a wireless communication system and device for the same are mainly described with reference to examples applied to 3GPP LTE system, the method and device can be applied to various kinds of wireless communication systems as well as to the 3GPP LTE system.

What is claimed is:

1. A method of transmitting a D2D (device-to-device) signal of a first UE (user equipment) in a wireless communication system, the method comprising:
   performing D2D transmission scheduling for a D2DSS (device-to-device synchronization signal) and a D2DCH (device-to-device channel) signal, wherein the D2DCH signal contains scheduling assignment and data; and
   dropping the data of the D2DCH signal in a first D2D subframe of a plurality of subframes in which D2DSS transmission is capable for the first UE or a second UE,
   wherein the first D2D subframe is a D2D subframe configured only for transmission of a D2DSS of the second UE among the plurality of subframes in which the D2DSS transmission is capable for the first UE or the second UE,
   wherein a resource region for the D2DSS transmission of the second UE in the first D2D subframe includes a D2DSS transmission frequency region and a guard region for the D2DSS transmission, and
   wherein a resource region for a D2DCH signal transmission in the first D2D subframe is not overlapped with the D2DSS transmission frequency region but overlapped only with the guard region for the D2DSS transmission.

2. A first UE (user equipment) for transmitting a D2D (device-to-device) signal in a wireless communication system, the UE comprising:
   a radio frequency unit; and
   a processor,
   wherein the processor is configured to:
   perform D2D transmission scheduling for a D2DSS (device-to-device synchronization signal) and a D2DCH (device-to-device channel) signal, wherein the D2DCH signal contains scheduling assignment and data; and
   drop the data of the D2DCH signal in a first D2D subframe of a plurality of subframes in which D2DSS transmission is capable for the first UE or a second UE,
   wherein the first D2D subframe is a D2D subframe configured only for transmission of a D2DSS of the second UE among the plurality of subframes in which the D2DSS transmission is capable for the first UE or the second UE,
   wherein a resource region for the D2DSS transmission of the second UE in the first D2D subframe includes a D2DSS transmission frequency region and a guard region for the D2DSS transmission, and
   wherein a resource region for a D2DCH signal transmission in the first D2D subframe is not overlapped with the D2DSS transmission frequency region but overlapped only with the guard region for the D2DSS transmission.

* * * * *